June 27, 1939.   W. I. JONES   2,164,014

SNAP FASTENER MEMBER

Filed July 20, 1937

Inventor:
Walter I. Jones

Patented June 27, 1939

2,164,014

UNITED STATES PATENT OFFICE 2,164,014

SNAP FASTENER MEMBER

Walter I. Jones, Arlington, Mass., assignor to United-Carr Fastener Corporation, Cambridge, Mass., a corporation of Massachusetts Application July 20, 1937, Serial No. 154,600

4 Claims. (Cl. 24—213)

This invention relates to improvements in snap fastener members, particularly, though not exclusively, adapted for use involving the upholstery of vehicle bodies and the like by means of detachably secured panels.

In the drawing, which illustrates a preferred embodiment of my invention:

The main object of my invention is to provide a simple, yet efficient, fastener member for attaching an upholstery panel or the like to a supporting structure. Through reason of the fact that my improved fastener member is particularly useful for the purpose of securing an upholstery panel to a metal frame structure, I prefer to describe it in connection with such an installation although there are many other uses to which my fastener could be directed which would fall within the spirit of this invention.

Figure 1:
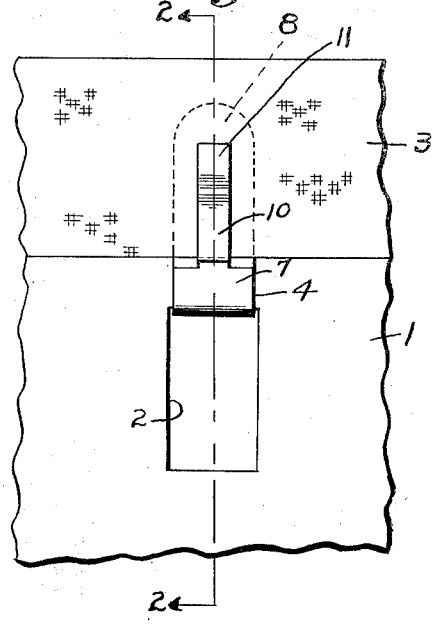
Figure 1 is a rear view of an upholstery panel ready for attachment to a support and showing my improved fastener member.
Figure 2:
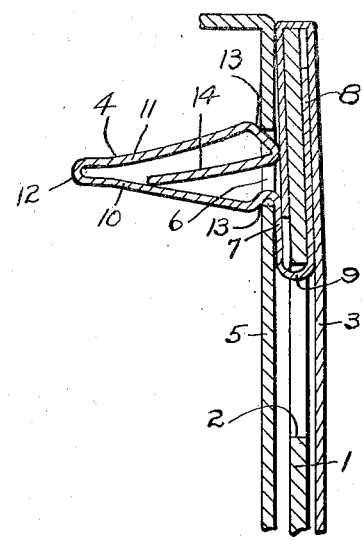
Fig. 2 is a section taken along the line 2—2 of Fig. 1.
Figure 3:
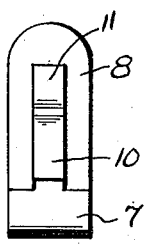
Fig. 3 is a top plan view of my fastener member per se.
Figure 4:
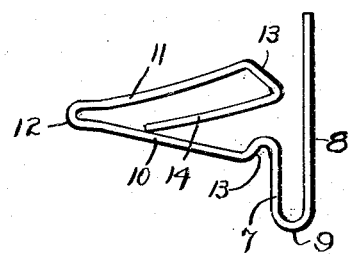
Fig. 4 is a side view of my fastener member per se.
Figure 5:
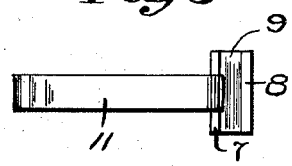
Fig. 5 is a front view of the fastener member shown in Figs. 3 and 4.

Referring to the embodiment of my invention illustrated by the drawing, I have shown in Figs. 1 and 2 a trimming installation for automobiles and the like. In the installation herein described I have provided a backing 1 of cardboard or the like having a rectangular-shaped aperture 2 formed within the periphery thereof. The front side of the backing is covered with suitable covering material 3 which is folded over the edge and secured to the backing in a manner well known in the art. My improved fastener member 4 is assembled with the panel and provides a stud portion adapted for fastening engagement with material of a frame 5, which may be the body of an automobile, adjacent an aperture 6 therein (Fig. 2) whereby the panel is secured to the frame.

Referring in detail to my improved fastener member 4, I have provided a fastener having a base and a stud means extending from one side of the base. The base of the fastener comprises a pair of spaced-apart arms 7 and 8 which are adapted to engage opposite sides of the panel to which the fastener is applied whereby the panel and the fastener member are assembled together. The arm 8 is preferably substantially longer than the arm 7 and extends laterally beyond the stud means so as to cooperate with the stud means of the fastener to pull down the edge of the panel, as will be hereinafter described. A portion 9 connects the arms 7 and 8 and maintains them in spaced relation. A stud portion extends from the arm 7 and is adapted to be snapped through the aperture 6 of the support 5. The stud portion comprises a pair of legs 10 and 11 preferably of narrower material than that of the arms 7 and 8 and connected at their leading end 12 forming a nose for guiding the stud means into engagement with a cooperating socket means. The end of the leg 10 opposite to the end connected to the leg 11 is integrally joined to the free end of the arm 7 and the leg 11 is free so that the stud means may have the proper resiliency for snap fastener engagement with a cooperating apertured part of the support 5. The legs 10 and 11 diverge from their connected ends toward said base and then converge providing shoulders 13—13 thereon for engagement with the material of the frame structure 5 adjacent the aperture 6. It will be noticed that the converging portion of the leg 11 is formed slightly longer than the converging portion of the leg 10 with the result that the free end of the converging portion of the leg 11 may engage a surface of the panel 3 when the parts are secured together (Fig. 2) thereby lessening the chance that the converging portion might slip out of the aperture 6 of the frame structure so as to overlie a surface of the frame structure and prevent ready withdrawal of the stud means. Furthermore, my preferred form of fastener member is constructed in such a way that most of the resiliency of the stud means is contained in the free leg 11 with the last-mentioned leg adapted to yield resiliently relative to the leg 10 which is comparatively rigid.

As a means for limiting relative movement of the leg 11 relative to the leg 10, and thereby stiffening the holding action of the stud means, I have provided a yieldable arm portion 14 integral with the outermost free end of the converging portion 13 of the leg 11. The arm portion 14 extends from its point of junction with the leg 11 substantially in the direction of the nose 12 and engages the diverging portion of the leg 10. The arm 14 is movable independently of the legs 10 and 11 with the result that movement of the leg 11 toward the leg is resisted when the fastener is engaged with the frame structure 5 thus providing a necessary amount of stiffness in the stud means. It will be apparent that the degree of stiffness of the stud means may be regulated through having the free end of the arm 14 disposed adjacent the leg 10 at a point nearer the base of the fastener member whereby the stiffness will be increased or having the free end of the arm 14 engage the leg 10 at a point nearer the nose 12 whereby the stiffness will be decreased. Thus by my invention the stud means of my fastener member may be constructed in a way to have any desired amount of resiliency depending upon the use for which the fastener may be intended.

My improved fastener stud member is preferably applied to an upholstery panel installation after the covering material 3 has been secured to the backing 1 and from the rear side by inserting the arm 8 through the aperture 2 and moving the connecting portion 9 into abutting engagement with an edge of the aperture 2 so that the fastener is disposed in the position shown in Figs. 1 and 2. The panel is now ready for attachment to the outer surface of the frame structure 5 through moving the stud means of the fastener member through the aperture 6 of the frame structure whereupon the shoulders 13 of the stud means engage the edges of the apertures 6, as most clearly shown in Fig. 2.

It is important to notice that my present fastener member has no laterally-extending projection at the free end of the converging portion of the leg 11 as provided by other fastener members now used commercially for a similar purpose and adapted to be positioned between the rear surface of the panel structure and the opposite face of the frame 5 on the other side of an aperture of the frame from that upon which the arm 7 of the fastener is disposed. Thus, through reason of the fact that in my present construction I have omitted the aforesaid laterally-extending projection, a pull-down action takes place between the outer end of the relatively long arm 8 and that portion of the converging portion 13 of the leg 11 which engages the frame 5 thereby drawing the edge of the panel structure tightly against a portion of the frame, as shown in Fig. 2. This pull-down fastener is an important one and my fastener is particularly adapted to that purpose, especially since the pull-down is also controlled, to a large extent, by the action of the converging portion 13 of the leg 11, which in turn is controlled by the stiffening arm 14.

Thus by my invention I have provided a fastener member capable of satisfactory operation in connection with an installation of the type illustrated and described and, also, other installations. At the same time, I have provided a fastener member which is designed in such a way that the action of the stud means thereof is stiffened, it being possible to regulate the stiffness of the stud means through slight modification of the construction of the same whereby the fastener is adaptable to a variety of uses.

Although I have illustrated and described a preferred form of my invention, I do not wish to be limited thereby because the scope of my invention is best set forth in the following claims.

I claim:

1. A snap fastener of the class described comprising a base portion, a snap fastener stud means extending in angular relation to said base portion, said stud having a pair of legs joined at their leading ends and movable toward and away from each other, said legs having shoulders for engagement with material adjacent a stud-receiving aperture, and an arm portion integral with one of said legs and extending toward the joined end between the legs into substantially adjacent relation with the other of said legs and acting to stiffen said legs when moved toward each other.

2. A snap fastener of the class described comprising a base portion, a snap fastener stud means extending in angular relation to said base portion, said stud means having a pair of shouldered legs joined at their leading ends and movable toward and away from each other, the free end of one only of said legs being integral with said base, and an arm portion integral with the other of said legs and extending between said legs into adjacent relation with the other of said legs and acting to stiffen said legs when moved toward each other.

3. A fastener member for attaching trim panels or the like to an apertured frame structure comprising a base having spaced-apart arms connected at one end and adapted to grip opposite sides of the panel to which the fastener is to be applied, one of said arms being substantially longer than the other of said arms and a stud means extending from the shorter of said arms, said stud means adapted to extend through an aperture of said frame structure and engage material of said frame adjacent said aperture, said stud means comprising a pair of legs disposed in opposite relation and connected at their leading ends, said legs diverging from their connected ends toward said arms and then converging so as to provide shoulders for engagement with said frame, the free end of one of said legs being integral with said shorter arm, the other of said legs terminating at the free end of said converging portion, the free end of said longer arm being disposed beyond a line parallel to the axis of said stud means through the most laterally remote point of said last-mentioned leg whereby said free end may cooperate with the converging portion of said last-mentioned leg to draw said trim panel toward said frame structure, and a stiffening portion integral with the free end of the converging portion of said last-mentioned leg and extending toward the leg integral with said shorter arm for stiffening said stud means.

4. A fastener member for attaching trim panels or the like to an apertured frame structure comprising a base having spaced-apart arms connected at one end and adapted to grip opposite sides of the panel to which the fastener is to be applied, one of said arms being substantially longer than the other of said arms and a snap fastener stud means extending from the shorter of said arms, said stud means adapted for engagement with a frame structure through an aperture thereof, said stud means comprising a pair of yieldable legs disposed in opposite relation and connected at their leading ends, said legs diverging from their connected ends toward said arms and then converging so as to provide shoulders for engagement with said frame, the end of one of said legs opposed to its connected end being integral with said shorter arm, the other of said legs terminating at the free end of said converging portion and the free end of said longer arm being disposed beyond a line parallel to the axis of said stud means through the most laterally remote point of said last-mentioned leg whereby the free end of said arm may cooperate with the converging portion of said last-mentioned leg to draw said trim panel toward said frame structure.

WALTER I. JONES